United States Patent [19]

Majewski et al.

[11] 4,448,431

[45] May 15, 1984

[54] CYLINDER HEAD GASKET

[75] Inventors: Klaus-Peter Majewski; Martin Morsbach, both of Burscheid; Dietrich Schülz, Leverkusen, all of Fed. Rep. of Germany

[73] Assignee: Goetze AG, Burscheid, Fed. Rep. of Germany

[21] Appl. No.: 48,996

[22] Filed: Jun. 15, 1979

[30] Foreign Application Priority Data

Jun. 16, 1978 [DE] Fed. Rep. of Germany ....... 2826386

[51] Int. Cl.³ .............................................. F16J 15/10
[52] U.S. Cl. ................................................. 277/325 B
[58] Field of Search .............................. 277/166, 235 B

[56] References Cited

U.S. PATENT DOCUMENTS 3,549,157  12/1970  Benningsen .
3,970,322   7/1976  Stecher et al. ................... 277/235 B

FOREIGN PATENT DOCUMENTS 2435957  5/1975  Fed. Rep. of Germany .
2304558  1/1976  Fed. Rep. of Germany .
2604253  8/1976  Fed. Rep. of Germany ... 277/235 B
1538222  7/1968  France .
1512081  1/1976  United Kingdom .

*Primary Examiner*—Robert I. Smith
*Attorney, Agent, or Firm*—Spencer & Frank

[57] ABSTRACT

In a cylinder head gasket for an internal-combustion engine, composed of a disc of fibrous and/or porous soft material provided with passages, and a metallic casing extending around one such passage and presenting two arms each disposed at a respective side of the disc with at least one arm being angled in the direction toward the soft material, and a saturating agent which is plastic or elastic when installed and which fills the pores of the soft material except for the region underneath the casing, the angled portion of the at least one arm has the configuration of an annular recess directed toward the interior of the disc in the immediate vicinity of the end of the one flange arm.

3 Claims, 1 Drawing Figure

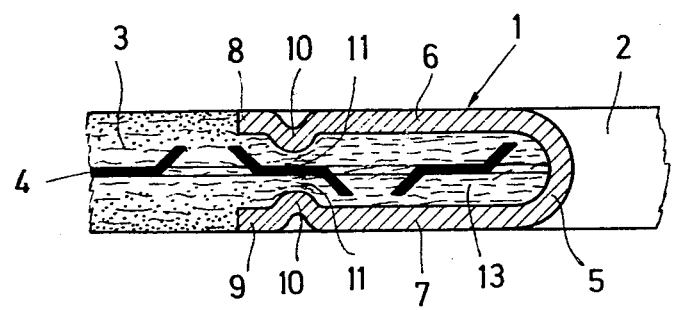

CYLINDER HEAD GASKET

BACKGROUND OF THE INVENTION

The present invention relates to a cylinder head gasket for an internal-combustion engine of the type including a disc of a fibrous and/or porous soft material which may be metallically reinforced and which is provided with a metallic casing, preferably around the combustion chamber passages, the casing having arms which are angled on one or both sides of the disc in the direction toward the soft material. In addition, gaskets of the type to which the invention is directed are impregnated with a saturation agent which is plastic or elastic in its final state and which fills either completely or in part the pores of the soft material except for the regions below the casing.

In practice, soft material cylinder head gaskets for internal-combustion engines are usually made of asbestos fiber webs which are possibly reinforced by embedded rough sheet metal plates. Particularly to increase their hardness and sealing properties, such cylinder head gaskets are impregnated with agents which in the final state are plastic or elastic, as disclosed, for example, in German.Auslegeschrift [Published Patent Application] No. 23 04 558.

Cylinder head gaskets designed for engines which undergo high stresses, however, should use soft material having a high yield point in regions which undergo the greatest stress from the compressive sealing forces. The compressive sealing forces are greatest under the flanges which are preferably applied around the combustion chamber passages, since here the thickness of the cylinder head gasket is increased by twice the thickness of the flange metal. Since, however, impregnating agents in the soft material reduce the yield point of the latter, the regions below the casings are kept free of impregnating agent, as disclosed in U.S. Pat. No. 3,970,322.

In the manufacture of such cylinder head gaskets, the completely cut and flanged blank sealing discs are impregnated, preferably by rolling, immersion or spraying, and the impregnating agent is then polymerized to its plastic or elastic consistency, preferably by heating. In this relatively simple process, the regions underneath the casings are covered by the flanges so that no impregnating agent can penetrate thereinto. Nevertheless, it may happen here and there during mass production that in some cylinder head gaskets impregnating agent will reach the area underneath the casings. This results in costly cylinder head gasket rejects which, due to the fact that the yield point of the soft material underneath the flanges is too low, are unsuited for use, particularly in very highly stressed engines.

As disclosed in German Auslegeschrift No. 24 35 957, it has already been proposed to create a sort of block against the penetrating impregnating agent by bending the ends of the flange arms at right angles into the soft material. As that publication discloses, however, this does not completely prevent the flow of impregnating agent in the embodiment illustrated in that publication and in the regions underneath the casings there is merely created a zone which has a low content of impregnating agents.

Tests have shown, however, that even small quantities of impregnating agent reduce the yield point of the soft material, even relatively more than if the soft material had been impregnated throughout. Obviously, such small quantities of impregnating agent are subject to a greater thermal insulation by the surrounding metal casing so that thermal treatment does not completely cross-link the agent located below the casings and that agent acts as a still liquid mass on the surrounding asbestos fibers like a sliding, or lubricating agent. The soft material under the casings will then yield more easily when the gasket is installed in an engine and is subjected to pressure stresses.

SUMMARY OF THE INVENTION

It is therefore an object of the present invention to provide a cylinder head gasket which in the flanged, blank state can be impregnated without producing rejects so as to produce a cylinder head gasket which is completely free of impregnating agent underneath the casings.

These and other objects are achieved, according to the present invention, in a cylinder head gasket for an internal-combustion engine, composed of a disc of fibrous and/or porous soft material provided with passages and a metallic casing extending around one such passage and presenting two arms each disposed at a respective side of the disc with at least one arm being angled in the direction toward the soft material, and a saturating agent which is plastic or elastic when installed and which fills the pores of the soft material except for the region underneath the casing, by forming the angled portion of the at least one arm to have the configuration of an annular recess directed toward the interior of the disc in the immediate vicinity of the end of the one flange arm.

The annular recesses in the casing can be pressed into the flange arms with particular ease directly after installation of the casings and simultaneously with a subsequent planing or smoothing process. In this case, the annular recesses preferably have an approximately V-shaped cross section.

In the tests which preceded the present invention it was found that the previously employed casings, which have only an approximately U-shaped cross section, may possibly spring outwardly again immediately after installation and planing so that impregnating agent is able to flow through the gap produced at the end of the flange arms to initially creep along the inside of the casings and then spread into the soft material. Such cylinder head gaskets, in which impregnating agent has gotten underneath the casings because of such springing open, have too low a yield point in these regions and must be considered as rejects.

In the cylinder head gaskets disclosed in German Auslegeschrift No. 24 35 957, the casings form a sort of block against influx of impregnating agent, but the sharply angled edges of the metal casings cut into the asbestos fiber matrix which thus loses its spring-back capability at this point. If the casings spring open, this will produce a gap to a greater degree through which, as described in that publication, impregnating agent will penetrate. The zones underneath the casings, although they are poorer in impregnating agent, no longer possess the required high yield point and the cylinder head gaskets can no longer be used, particularly for highly stressed engines.

With the notch-like recesses pressed in, preferably on both sides, in the vicinity of the flange arm ends, according to the present invention, the soft material disposed underneath this area is compressed completely without destruction and thus is given a high spring-back capability which is greater than the inherent spring back of the flange metal. If the casings should spring open, the general condition for a force-locking connection between flange and asbestos is still met in the area of the notch. In addition, the pressing of the notches according to the invention provides a form-locking contact between the soft material and the entire flange metal.

Due to this force and form-locking connection of soft material and casing metal, the impregnating agent can penetrate at most to the recess during the subsequent impregnating process if the flange should spring back. The resulting cylinder head gaskets retain the required high yield points in the regions underneath the casings and can be used even in highly stressed internal-combustion engines. Moreover, the notches can be stamped into the flange metal in a simple process step so that the manufacturing cost for the cylinder head gasket according to the invention and together with it the number of rejects are reduced considerably.

BRIEF DESCRIPTION OF THE DRAWING

The sole FIGURE is a cross-sectional detail view of a cylinder head gasket according to a preferred embodiment of the invention.

DESCRIPTION OF THE PREFERRED EMBODIMENT

The FIGURE shows the portion of a gasket 1 in the area adjacent a combustion chamber 2. The cylinder head gasket 1 is composed of an asbestos fiber web plate 3 into which a metallic reinforcement disc 4 has been embedded and which has a metallic casing 5. The casing 5 includes flange arms 6 and 7, which are stamped at their free ends 8 and 9, respectively, to form notches 10 which have an approximately V-shaped cross section. The soft material 11 underneath each notch 10 is thus greatly compressed. In the subsequent impregnating step, performed in the conventional manner, the remaining regions of the soft material are filled with impregnating agent to about ⅔ of their cross section while the region 13 of the soft material underneath the casing 5 remains absolutely free of impregnating agent.

It will be understood that the above description of the present invention is susceptible to various modifications, changes and adaptations, and the same are intended to be comprehended within the meaning and range of equivalents of the appended claims.

What is claimed is:

1. In a cylinder head gasket for an internal-combustion engine, composed of a disc of fibrous and/or porous soft material provided with passages, and a metallic casing extending around one such passage and presenting two arms each disposed at a respective side of the disc with at least one arm being angled in the direction toward the soft material, and a saturating agent which is plastic or elastic when installed and which fills the pores of the soft material except for the region underneath the casing, the improvement wherein the angled portion of said at least one arm has the configuration of an annular recess directed toward the interior of said disc in the immediate vicinity of the end of said one flange arm and said annular recess is pressed into said at least one arm after said casing has been placed around said disc and compresses the material of said disc thereunder to an extent sufficient to prevent movement of the saturating agent through said disc beyond the region where said recess compresses said disc material.

2. Cylinder head gasket as defined in claim 1 wherein said annular recess has an approximately V-shaped cross section.

3. Cylinder head gasket as defined in claim 1 or 2 wherein each of said arms is angled toward the soft material and the angled portion of each said arm has said annular recess configuration.

* * * * *